UNITED STATES PATENT OFFICE.

JOHN HARRIS, OF LAKEWOOD, OHIO, ASSIGNOR OF ONE-HALF TO J. R. ROSE, OF PITTSBURGH, PENNSYLVANIA.

GAS FOR CUTTING AND WELDING PURPOSES.

1,329,400.

Specification of Letters Patent. Patented Feb. 3, 1920.

No Drawing. Application filed August 3, 1918. Serial No. 248,112.

*To all whom it may concern:*

Be it known that I, JOHN HARRIS, a citizen of the United States, residing at Lakewood, in the county of Cuyahoga and State of Ohio, have invented a certain new and useful Improvement in Gases for Cutting and Welding Purposes, of which the following is a full, clear, and exact description, reference being had to the accompanying drawings.

This invention relates to the production of gases such as are employed with blow pipes or torches for cutting and welding metals. It is the general object of this invention to produce a gas which, while extremely economical of production, is capable of realizing the cutting and welding operations in a particularly efficient manner.

It has been proposed to employ hydrogen for the purpose of pre-heating metal in cutting with oxygen, also for pre-heating metal in connection with the operation of welding the same with gases. The objection to the use of hydrogen is that the flame produced by the combustion thereof is colorless, making it extremely difficult to bring the flame in proper relation to the metal.

It is the object of my invention to produce a gas which will secure all of the advantages which may be derived from the use of hydrogen, but will be free from the objection above noted which has heretofore attended this use.

In the production of such a gas, I add to hydrogen from 5% to 20% by volume of carbon monoxid. As carbon monoxid has a flame temperature above that of hydrogen, the flame temperature produced by the combustion of the mixture of the same with hydrogen is higher than that of the hydrogen flame; furthermore by the addition of carbon monoxid to the hydrogen, a clearly defined visible cone will be produced, which will extend from the blow pipe tip and enable the operator to apply to the metal the particular part of the flame (the tip of the cone) where the highest temperature exists; and this cone of intense temperature will extend a sufficient distance from the blow pipe tip to enable the operator conveniently to apply and position the flame with reference to the work.

Because of the cheapness of its production, hydrogen is the most economical gas with which I am familiar the combustion whereof will produce the temperatures requisite for cutting and welding purposes. However, because of the objection noted hereinbefore, it has been found impracticable hitherto to employ it for such purposes. By mixing carbon monoxid with hydrogen in about the proportions specified, the cost of the resultant mixture is not materially greater than that of hydrogen; and, by the use of such mixture, I am enabled to obviate the objection that has hitherto rendered the use of hydrogen impracticable for the cutting and welding of metals and thus to open up a large and important field for its use. In plants wherein oxygen is produced by the electrolytic process, hydrogen has heretofore been allowed to go to waste. By adding the proportion of carbon monoxid herein specified, I am enabled to make use of this waste product. I am also able to produce a flame the temperature whereof is higher than that of a flame produced from the combustion of hydrogen alone, and this temperature is the highest attainable with any of the gases except acetylene. I am also able to produce a gas suitable for cutting and welding purposes which require for its combustion a minimum consumption of the expensive combustion-supporter oxygen. Furthermore, the flame produced by the combustion of the mixture accomplishes a very quick preheating of the metal, and the tendency of the flame to "flash back" within the tips is reduced to a minimum.

It has been found that even small proportions of inert gases, such as carbon dioxid and nitrogen, are detrimental to the efficiency of cutting and welding gases, even when present to the extent of only 1% to 2% by volume. My gas consists of a mixture of hydrogen and carbon monoxid only, with no inert gases.

Having thus described my invention, what I claim is:—

A gas for cutting and welding purposes comprising a mixture of hydrogen and carbon monoxid only, the carbon monoxid constituting not materially less than 5% nor materially greater than 20%, by volume, of the hydrogen.

In testimony whereof, I hereunto affix my signature.

JOHN HARRIS.